US012225532B2

(12) United States Patent
Wang et al.

(10) Patent No.: US 12,225,532 B2
(45) Date of Patent: Feb. 11, 2025

(54) SIDELINK REFERENCE SIGNAL AND MEASUREMENT REPORT SHARING

(71) Applicant: QUALCOMM Incorporated, San Diego, CA (US)

(72) Inventors: Hua Wang, Basking Ridge, NJ (US); Sony Akkarakaran, Poway, CA (US); Jelena Damnjanovic, Del Mar, CA (US); Qing Li, Princeton Junction, NJ (US); Hong Cheng, Basking Ridge, NJ (US); Yan Zhou, San Diego, CA (US); Jung Ho Ryu, Fort Lee, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 191 days.

(21) Appl. No.: 17/648,487

(22) Filed: Jan. 20, 2022

(65) Prior Publication Data
US 2023/0232401 A1 Jul. 20, 2023

(51) Int. Cl.
*H04W 72/20* (2023.01)
*H04L 5/00* (2006.01)
*H04W 24/10* (2009.01)
*H04B 7/06* (2006.01)

(52) U.S. Cl.
CPC ........... *H04W 72/20* (2023.01); *H04L 5/0051* (2013.01); *H04W 24/10* (2013.01); *H04B 7/0626* (2013.01); *H04B 7/0632* (2013.01)

(58) Field of Classification Search
CPC ..... H04W 72/20; H04W 24/10; H04W 92/18; H04W 76/14; H04L 5/0051; H04L 5/0023; H04L 5/0048; H04L 5/0094; H04L 1/0026; H04L 1/0027; H04B 7/0626; H04B 7/0632; H04B 7/069
See application file for complete search history.

(56) References Cited

U.S. PATENT DOCUMENTS

| | | | |
|---|---|---|---|
| 2020/0252990 A1* | 8/2020 | Ganesan | H04W 76/14 |
| 2020/0260472 A1* | 8/2020 | Ganesan | H04W 72/20 |
| 2020/0374978 A1* | 11/2020 | Panteleev | H04W 88/04 |
| 2022/0131645 A1* | 4/2022 | Miao | H04L 1/08 |
| 2022/0183017 A1* | 6/2022 | Wu | H04B 17/309 |
| 2022/0225292 A1* | 7/2022 | Mohammad Soleymani | H04W 72/20 |
| 2022/0286184 A1* | 9/2022 | Li | H04L 5/0051 |
| 2022/0376761 A1* | 11/2022 | Lee | H04L 5/005 |

FOREIGN PATENT DOCUMENTS

WO WO-2020144188 A1 * 7/2020 ........... H04B 7/0626

* cited by examiner

*Primary Examiner* — Thai Nguyen
(74) *Attorney, Agent, or Firm* — Harrity & Harrity, LLP

(57) ABSTRACT

Various aspects of the present disclosure generally relate to wireless communication. In some aspects, a first user equipment (UE) may generate information indicating a reference signal and a measurement report for a first sidelink between the first UE and a second UE. The first UE may use the information for a second sidelink between the first UE and the second UE. Numerous other aspects are described.

24 Claims, 12 Drawing Sheets

1000 ⟶

SIDELINK REFERENCE SIGNAL AND MEASUREMENT REPORT SHARING

FIELD OF THE DISCLOSURE

Aspects of the present disclosure generally relate to wireless communication and to techniques and apparatuses for sharing sidelink reference signals and measurement reports.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first user equipment (UE). The method may include generating information indicating a reference signal and a measurement report for a first sidelink between the first UE and a second UE. The method may include using the information for a second sidelink between the first UE and the second UE.

Some aspects described herein relate to a method of wireless communication performed by a second UE. The method may include receiving, from a first UE, information indicating a reference signal and a measurement report for a first sidelink between the first UE and the second UE. The method may include transmitting or receiving the reference signal on a second sidelink between the first UE and the second UE. The method may include transmitting or receiving the measurement report on the second sidelink.

Some aspects described herein relate to a first UE for wireless communication. The first UE may include a memory and one or more processors coupled to the memory. The one or more processors may be configured to generate information indicating a reference signal and a measurement report for a first sidelink between the first UE and a second UE. The one or more processors may be configured to use the information for a second sidelink between the first UE and the second UE.

Some aspects described herein relate to a second UE for wireless communication. The second UE may include a memory and one or more processors coupled to the memory. The one or more processors may be configured to receive, from a first UE, information indicating a reference signal and a measurement report for a first sidelink between the first UE and the second UE. The one or more processors may be configured to transmit or receive the reference signal on a second sidelink between the first UE and the second UE. The one or more processors may be configured to transmit or receive the measurement report on the second sidelink.

Some aspects described herein relate to a non-transitory computer-readable medium that stores a set of instructions for wireless communication by a first UE. The set of instructions, when executed by one or more processors of the first UE, may cause the first UE to generate information indicating a reference signal and a measurement report for a first sidelink between the first UE and a second UE. The set of instructions, when executed by one or more processors of the first UE, may cause the first UE to use the information for a second sidelink between the first UE and the second UE.

Some aspects described herein relate to a non-transitory computer-readable medium that stores a set of instructions for wireless communication by a second UE. The set of instructions, when executed by one or more processors of the second UE, may cause the second UE to receive, from a first UE, information indicating a reference signal and a measurement report for a first sidelink between the first UE and the second UE. The set of instructions, when executed by one or more processors of the second UE, may cause the second UE to transmit or receive the reference signal on a second sidelink between the first UE and the second UE. The set of instructions, when executed by one or more processors of the second UE, may cause the second UE to transmit or receive the measurement report on the second sidelink.

Some aspects described herein relate to an apparatus for wireless communication. The apparatus may include means for generating information indicating a reference signal and a measurement report for a first sidelink between the apparatus and another apparatus. The apparatus may include means for using the information for a second sidelink between the apparatus and the other apparatus.

Some aspects described herein relate to an apparatus for wireless communication. The apparatus may include means for receiving, from another apparatus, information indicating a reference signal and a measurement report for a first sidelink between the apparatus and the other apparatus. The apparatus may include means for transmitting or receiving the reference signal on a second sidelink between the apparatus and the other apparatus. The apparatus may include means for transmitting or receiving the measurement report on the second sidelink.

Aspects generally include a method, apparatus, system, computer program product, non-transitory computer-readable medium, UE, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
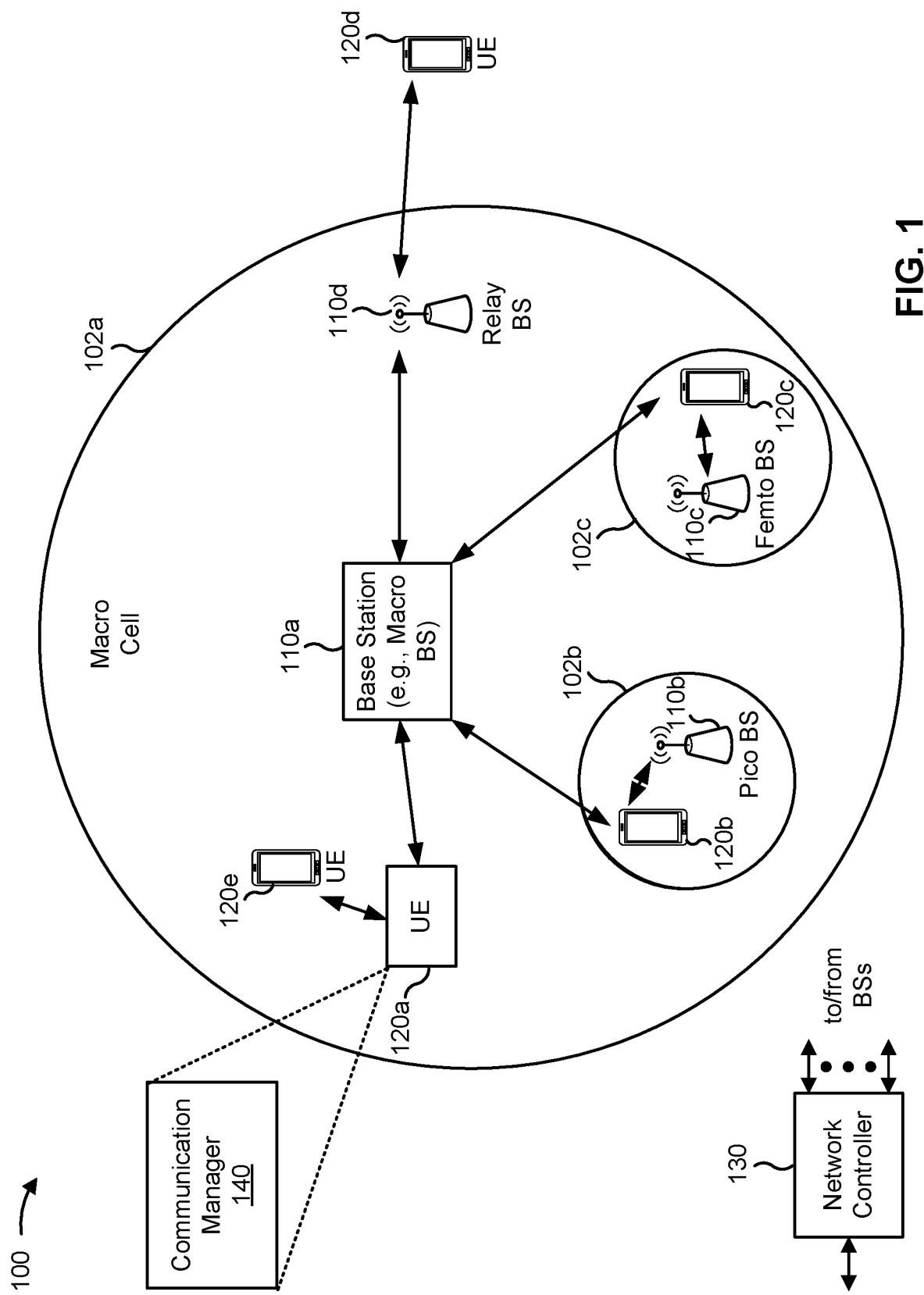
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first UE (e.g., a UE 120) may include a communication manager 140. As described in more detail elsewhere herein, the communication manager 140 may generate information indicating a reference signal and a measurement report for a first sidelink between the first UE and a second UE. The communication manager 140 may use the information for a second sidelink between the first UE and the second UE.

In some aspects, a second UE (e.g., a UE 120) may include a communication manager 140. As described in more detail elsewhere herein, the communication manager 140 may receive, from a first UE, information indicating a reference signal and a measurement report for a first sidelink between the first UE and the second UE. The communication manager 140 may transmit or receive the reference signal on a second sidelink between the first UE and the second UE. The communication manager 140 may transmit or receive the measurement report on the second sidelink. Additionally, or alternatively, the communication manager 140 may perform one or more other operations described herein.

As indicated above, FIG. 1 is provided as an example. Other examples may differ from what is described with regard to FIG. 1.

Figure 2:
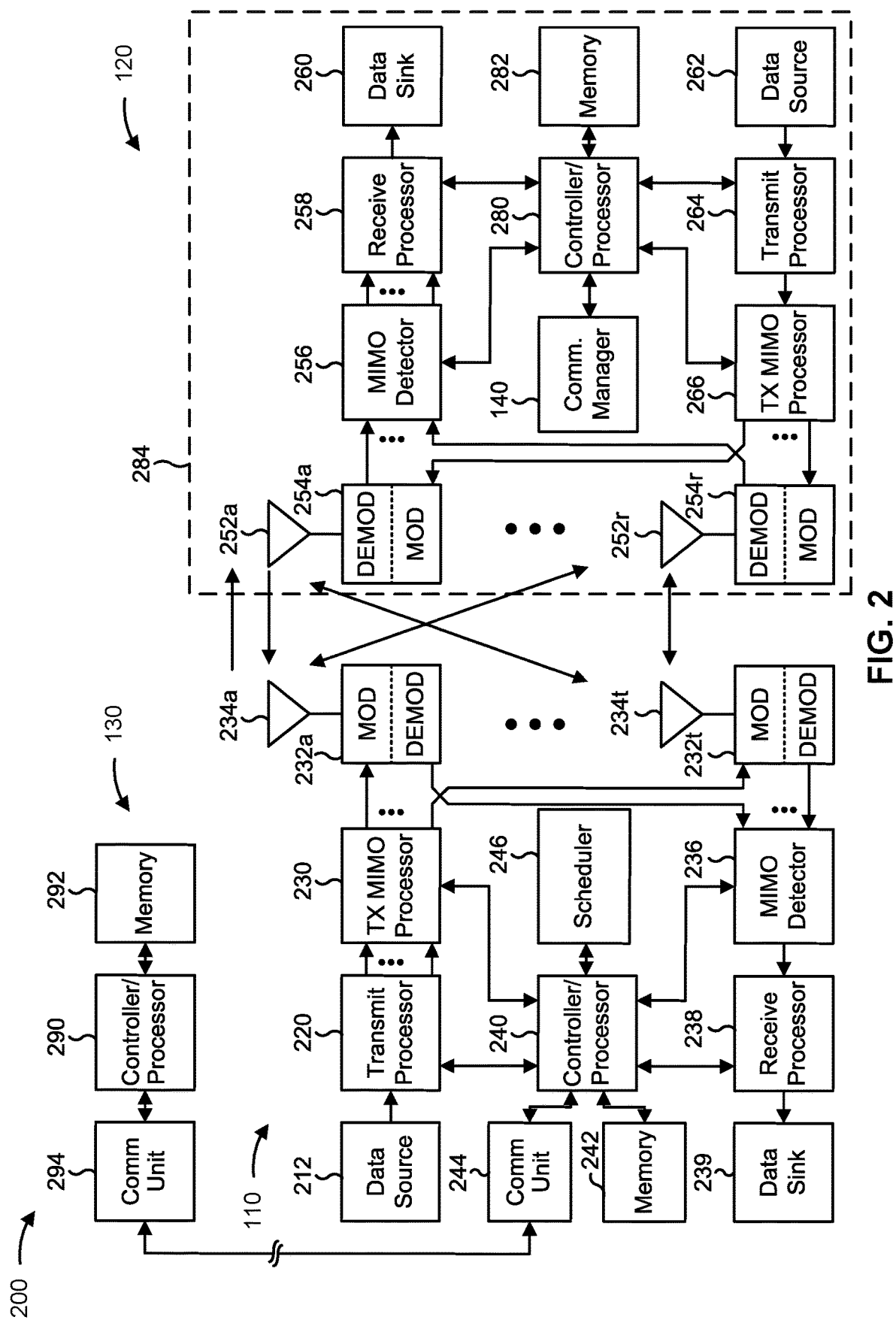
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-12).

The controller/processor 240 of the base station 110, the controller/processor 280 of the UE 120, and/or any other component(s) of FIG. 2 may perform one or more techniques associated with sharing sidelink reference signals and measurement reports, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, a first UE (e.g., a UE 120) includes means for generating information indicating a reference signal and a measurement report for a first sidelink between the first UE and a second UE; and/or means for using the information for a second sidelink between the first UE and the second UE. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a second UE (e.g., a UE 120) includes means for receiving, from a first UE, information indicating a reference signal and a measurement report for a first sidelink between the first UE and the second UE; means for transmitting or receiving the reference signal on a second sidelink between the first UE and the second UE; and/or means for transmitting or receiving the measurement report on the second sidelink. The means for the second UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
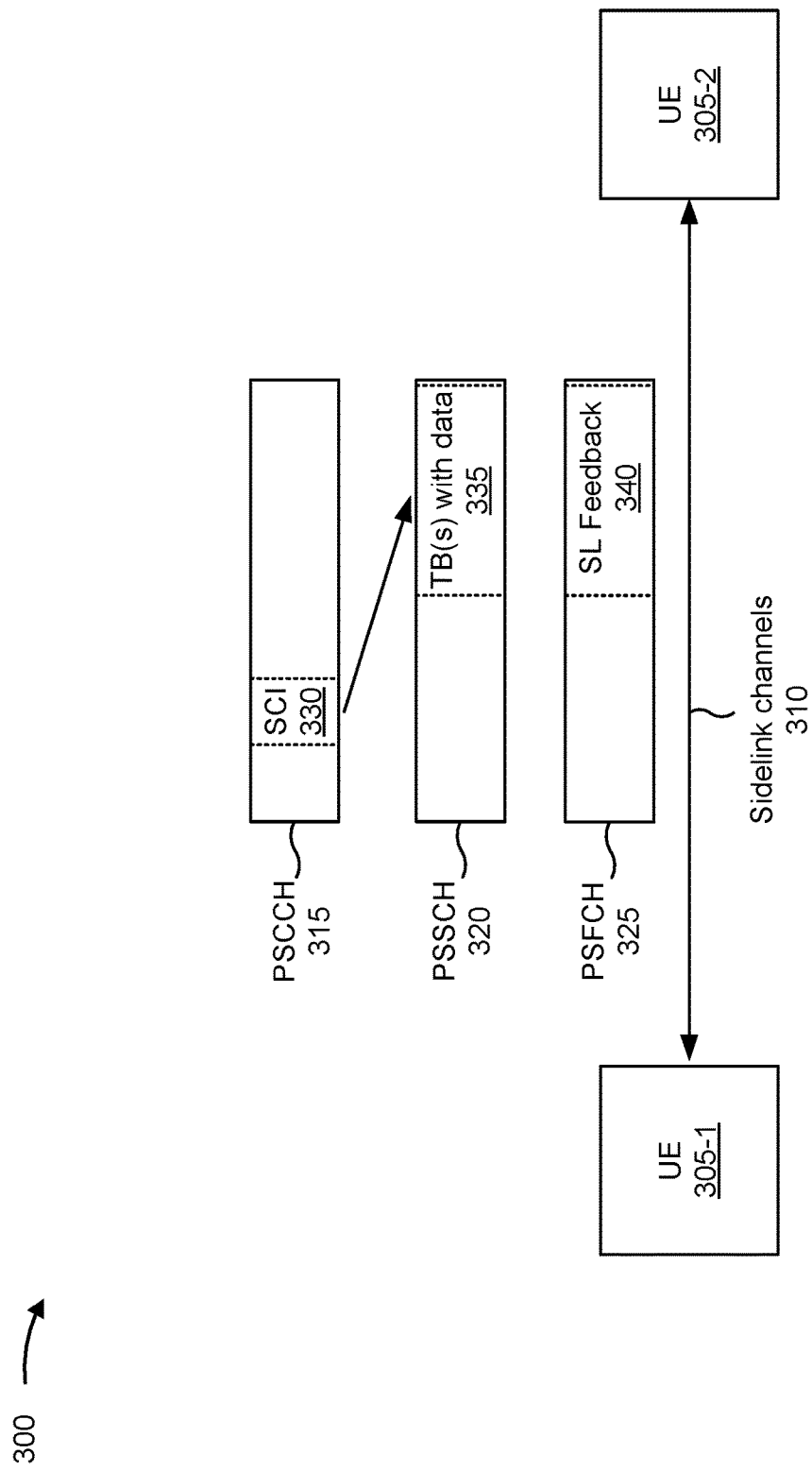
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request.

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process identifier (ID), a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a base station 110. For example, the UE 305 may receive a grant (e.g., in downlink control information (DCI) or in a radio resource control (RRC) message, such as for configured grants) from the base station 110 for sidelink channel access and/or scheduling.

In some aspects, a UE 305 may operate using a transmission mode (e.g., Mode 2) where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a specified set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

To receive a sidelink packet, a receiving sidelink UE may perform blind decoding on all sidelink subchannels. The quantity of subchannels may be small (e.g., 1-27 subchannels) such that blind decoding on all subchannels is still feasible. A transmitting sidelink UE may transmit a PSCCH communication and a PSSCH communication within a same slot. The PSSCH communication may occupy up to $N_{subchannel}^{SL}$ contiguous subchannels. The PSCCH communication may occupy up to one subchannel with the lowest subchannel index. The transmitting sidelink UE may transmit a first stage SCI in the PSCCH communication with information about the PSSCH bandwidth and resource reservations in future slots. The receiving sidelink UE may receive and decode a second stage SCI after decoding the PSCCH communication, where the source ID identifies the transmitting sidelink UE and the destination ID identifies the receiving sidelink UE.

As indicated above, FIG. 3 is provided as an example. Other examples may differ from what is described with respect to FIG. 3.

Figure 4:
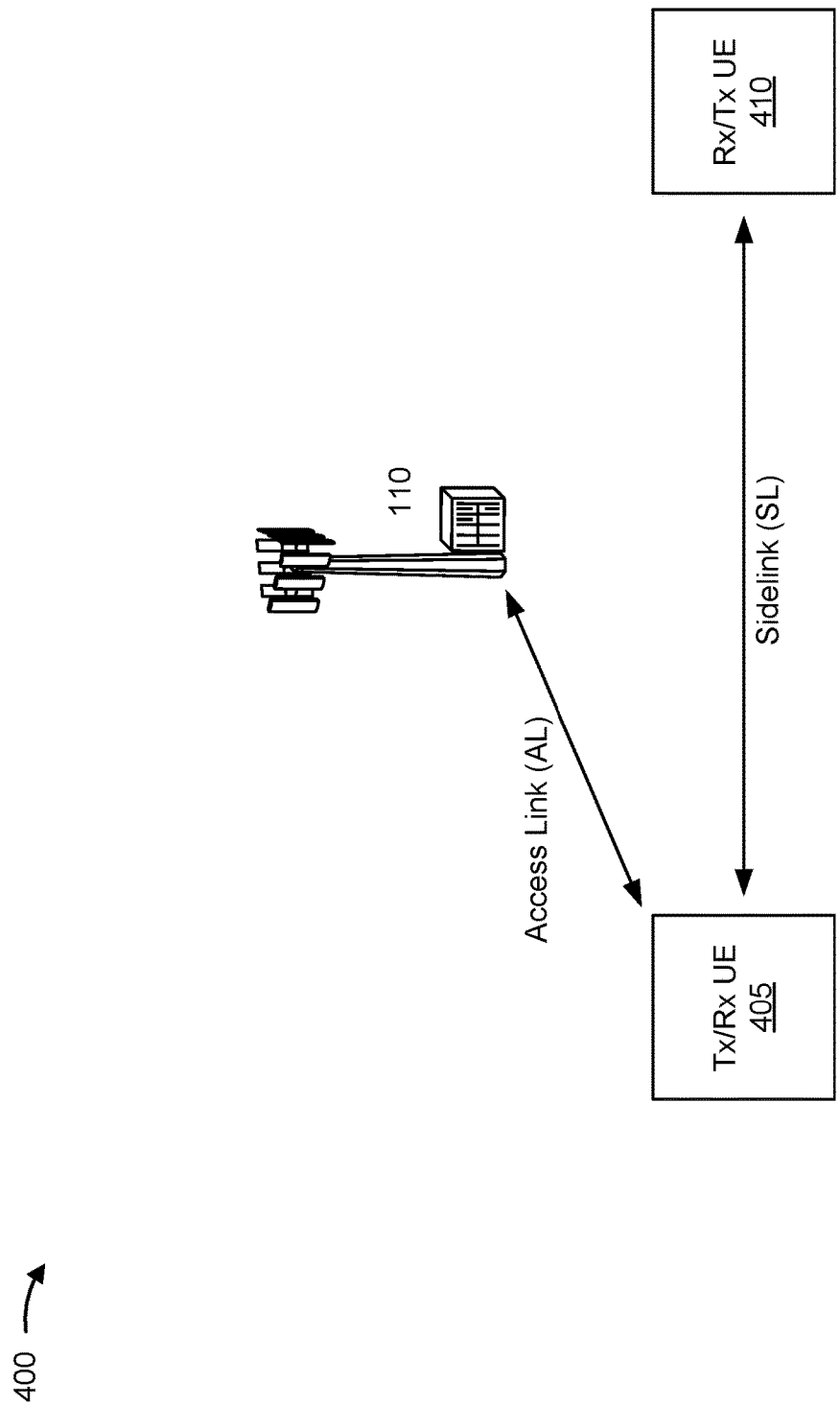
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
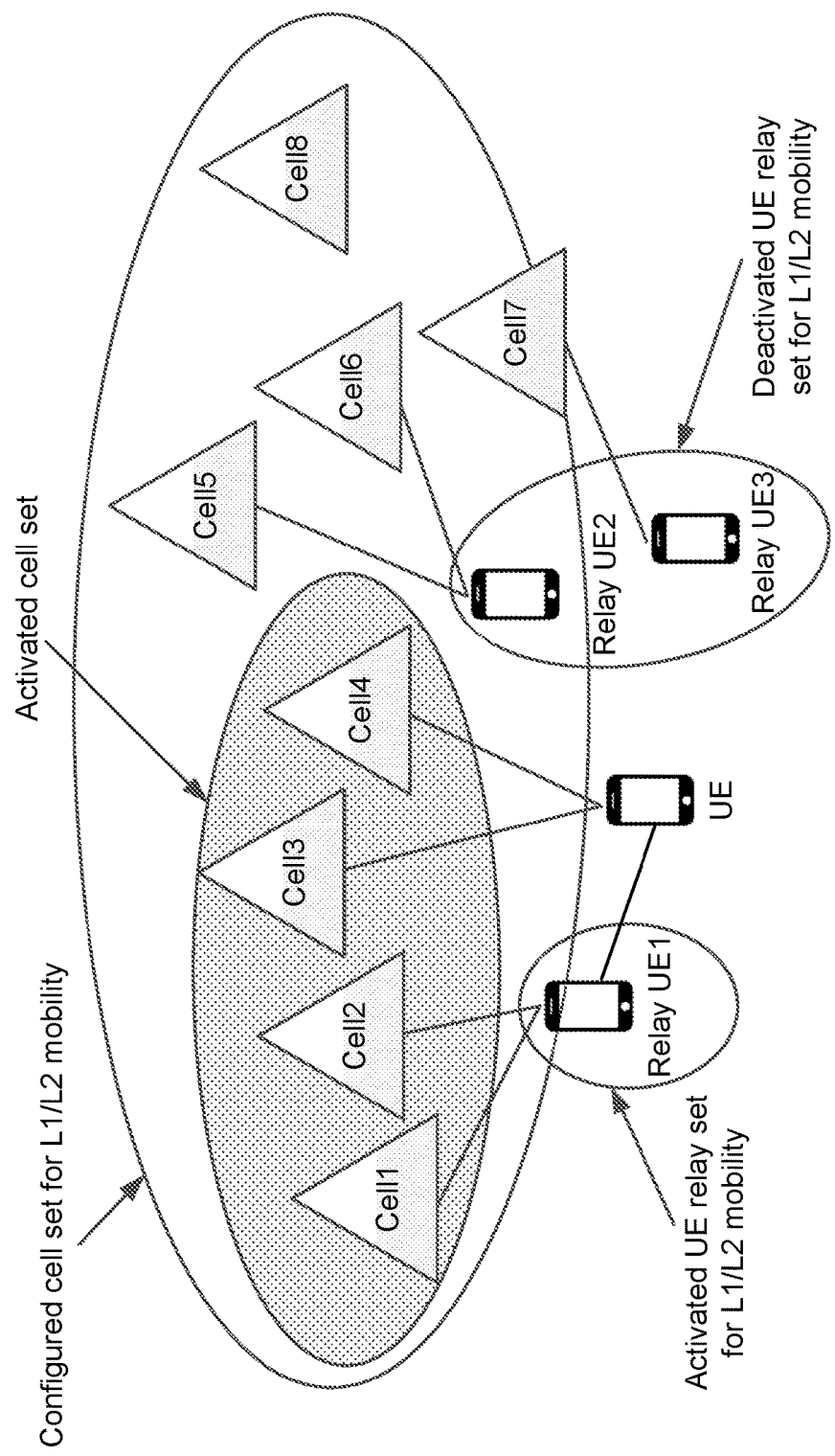
FIG. 5 is a diagram illustrating an example of relay UEs, in accordance with the present disclosure.

FIG. 5 is a diagram illustrating an example 500 of relay UEs, in accordance with the present disclosure. Example 500 shows cells that may be part of a configured cell set for Layer 1 (L1)/Layer 2 (L2) mobility. Active cells may be part of an activated cell set.

A sidelink UE may use L1/L2 signaling to select one or more sidelink UEs that are connected to the same base station (e.g., same active cell set) to serve as UE relays. The relay UEs may be part of a configured UE relay set. An activated UE relay set may be a UE relay set that is activated and actively serving the UE. A deactivated UE relay set may be a UE relay set that is deactivated and prepared to serve the UE.

As indicated above, FIG. 5 is provided as an example. Other examples may differ from what is described with regard to FIG. 5.

Figure 6:
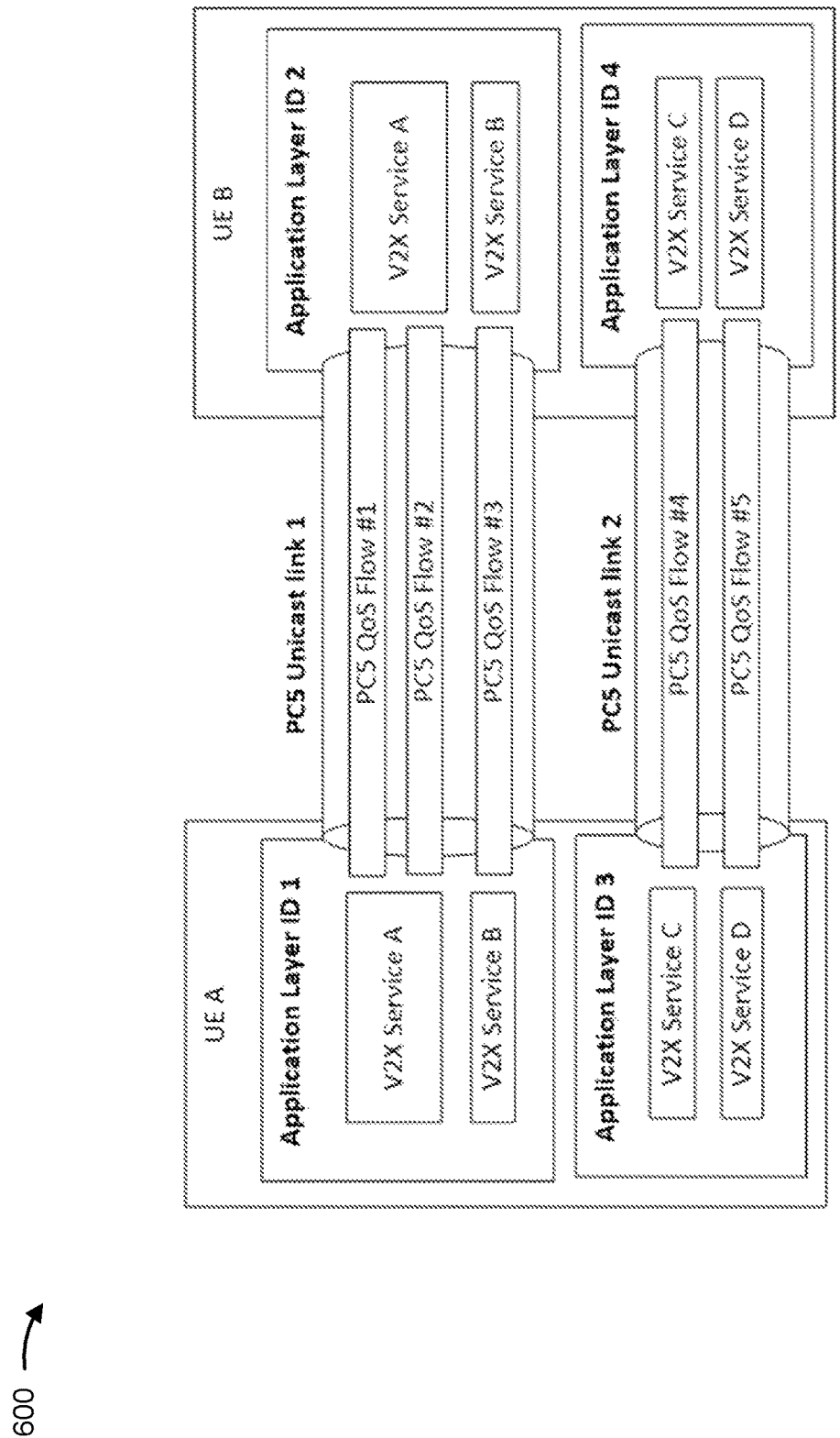
FIG. 6 is a diagram illustrating an example of unicast links between sidelink UEs, in accordance with the present disclosure.

FIG. 6 is a diagram illustrating an example 600 of unicast links between sidelink UEs, in accordance with the present disclosure.

Example 600 shows FIG. 5.2.1.4-1 of 3GPP Technical Specification (TS) 23.287, where there are multiple sidelink (PC5) unicast links for V2X communications between peer V2X services, such as V2X service A used by UE A and UE B. Each unicast link may carry a PC5 QoS flow that is associated with a V2X service at the application layer. V2X services in a UE that use the same PC5 unicast link may use the same application layer ID. For example, as shown in example 600, unicast link 1 includes QoS flow #1 and QoS flow #2 between application layer ID 1 and application layer ID 2. A source UE may not be required to know whether different target application layer IDs over different unicast links belong to the same target UE.

A unicast sidelink can be a standalone sidelink (e.g., for V2X application) or a sidelink UE relay. Each unicast sidelink may have its own PC5 RRC connection and/or a separate CSI reference signal (CSI-RS) or CSI report. A transmitting sidelink UE may transmit a sidelink CSI-RS with a CSI request field set to 1 in SCI-2, and the sidelink CSI-RS may be associated with a pair of UEs (source ID and destination ID pair). A receiving sidelink UE may transmit a CSI report (e.g., via a medium access control control element (MAC CE)). Each unicast sidelink may have its own separate CSI-RS report. However, if there are many unicast sidelinks, this may involve a high amount of overhead and signaling resources.

According to various aspects described herein, a first UE may share CSI-RSs and/or CSI reports for one sidelink to a second UE with other sidelinks to the second UE. As a result, the first UE may reduce overhead and cause the first UE and the second UE to conserve signaling resources. For example, the first UE may generate information indicating a reference signal (e.g., a CSI-RS, sidelink PSS/SSS, sidelink DMRS, a transmission configuration indicator (TCI) reference signal) and a measurement report (e.g., a CSI report, CQI) for a first sidelink between the first UE and a second UE.

The first UE may use the information for a second sidelink between the first UE and the second UE. The first UE may transmit the information via the first sidelink, via the second sidelink, or via a dedicated sidelink that is dedicated for sharing the information between the first UE and the second UE. The first sidelink or the second sidelink may be a relay sidelink that uses standalone sidelink CSI. The first UE may use an existing CSI framework for configuring sidelinks for sharing CSI-RSs and CSI reporting.

To enable such sharing, each sidelink may be determined by an L2 source ID and an L2 destination ID. Each L2 ID may be linked to a physical ID indicating the physical device. Each UE may know which source ID and destination ID are linked to the same physical device (the physical ID itself may not need to be known at the first UE). The first UE may share the information via PC5 RRC messages. For example, the first UE and the second UE may establish a first sidelink (SL1) and exchange the L2 ID for SL1. Later, when establishing SL2, the first UE may transmit the pair (SL1's L2 ID, SL2's L2 ID) in PC5 RRC messaging to the second UE, and the second UE may know that the two IDs are for the same physical device. A base station may also assist with sharing the information.

As indicated above, FIG. 6 is provided as an example. Other examples may differ from what is described with regard to FIG. 6.

Figure 7:
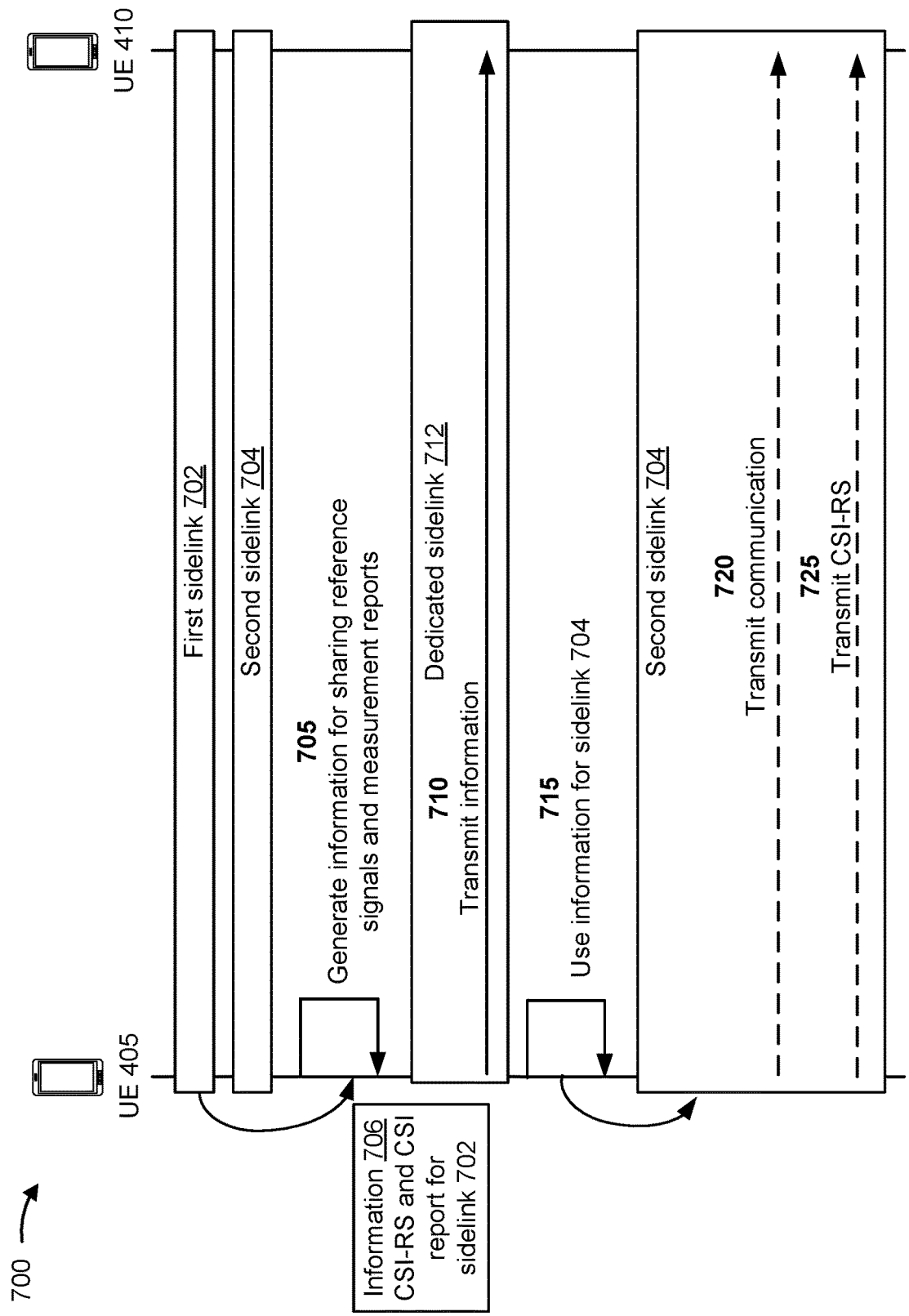
FIG. 7 is a diagram illustrating an example of sharing reference signals and measurement reports across sidelinks, in accordance with the present disclosure.

FIG. 7 is a diagram illustrating an example 700 of sharing reference signals and measurement reports across sidelinks, in accordance with the present disclosure. Example 700 shows that a first UE (e.g., UE 405) and a second UE (e.g., UE 410) may communicate with each other over multiple sidelinks, such as first sidelink 702 and second sidelink 704.

The sidelinks may be unicast links, broadcast links, or groupcast links, and the aspects described herein may apply to any combination of such sidelinks. However, for ease of explanation, sidelink 702 and sidelink 704 may be unicast links in example 700. UE 405 may transmit a MAC CE that activates a TCI state and that includes a source ID and/or a destination ID of sidelink 704.

As shown by reference number 705, UE 405 may generate information 706 for sharing reference signals and measurement reports. The information 706 may indicate, for example, a reference signal (e.g., CSI-RS) and a measurement report (e.g., CSI report) used by sidelink 702. As shown by reference number 710, UE 405 may transmit the information 706 to UE 410. In some aspects, UE 405 may transmit the information on sidelink 702, on sidelink 704, or on a dedicated sidelink 712 that is dedicated for sharing information between UE 405 and UE 410.

As shown by reference number 715, UE 405 may use the information 706 from sidelink 702 for sidelink 704. For example, as shown by reference number 720, UE 405 may transmit a communication on sidelink 704 based at least in part on a CSI report for sidelink 702. In some aspects, as shown by reference number 725, UE 405 may transmit a CSI-RS with the same or similar configuration as used for sidelink 702. UE 405 may transmit the CSI-RS in FR2, for example. UE 410 may use measurements of the CSI-RS and/or transmit a CSI report for the CSI-RS on sidelink 702, on sidelink 704, or on dedicated sidelink 712.

In some aspects, UE 405 may share a TCI using the same resource pool, an overlapping resource pool, or a non-overlapping resource pool. UE 405 may use a TCI reference signal that is shared across sidelinks. That is, TCI reference signals on the sidelinks may share the same configuration. Each sidelink may have its own PC5 RRC connection with a configured TCI states list. When setting a sidelink TCI state for a sidelink (e.g., sidelink 704), the source reference signal may be a reference signal used for the other sidelink (e.g., sidelink 702). A MAC CE for activating the TCI state for sidelink 704 may include the source ID and the destination ID pair of sidelink 702 to indicate that the TCI state is from sidelink 702's TCI state list. The configuration of the CSI-RS of sidelink 702 may be known for sidelink 704.

In some aspects, UE 405 may use dedicated sidelink 712 for sharing TCI reference signals. Dedicated sidelink 712 may have a configured TCI states list, and UE 405 may share the TCI states list with all other sidelinks between UE 405 and UE 410. UE 405 may include the information 706 in the TCI states list. UE 405 may also share the configuration of the CSI-RS. When setting a TCI state for sidelink 704, the source reference signal may be the CSI-RS of the dedicated sidelink 712. UE 405 may transmit a MAC CE to activate the TCI state, but with dedicated sidelink 712, the MAC CE may not need to include a source ID and a destination ID. Sidelink 702 or sidelink 704 may be used as a dedicated sidelink. When dedicated sidelink 712 or another dedicated sidelink is deactivated or torn down (e.g., too congested for beam sweeping), another sidelink may be used as a dedicated sidelink.

By sharing reference signals (reference signal configurations) and CSI across sidelinks, UE 405 may cause UE 405 and UE 410 to conserve signaling resources, because less signaling is used to provide separate reference signal configurations and CSI reports for each sidelink.

As indicated above, FIG. 7 is provided as an example. Other examples may differ from what is described with regard to FIG. 7.

Figure 8:
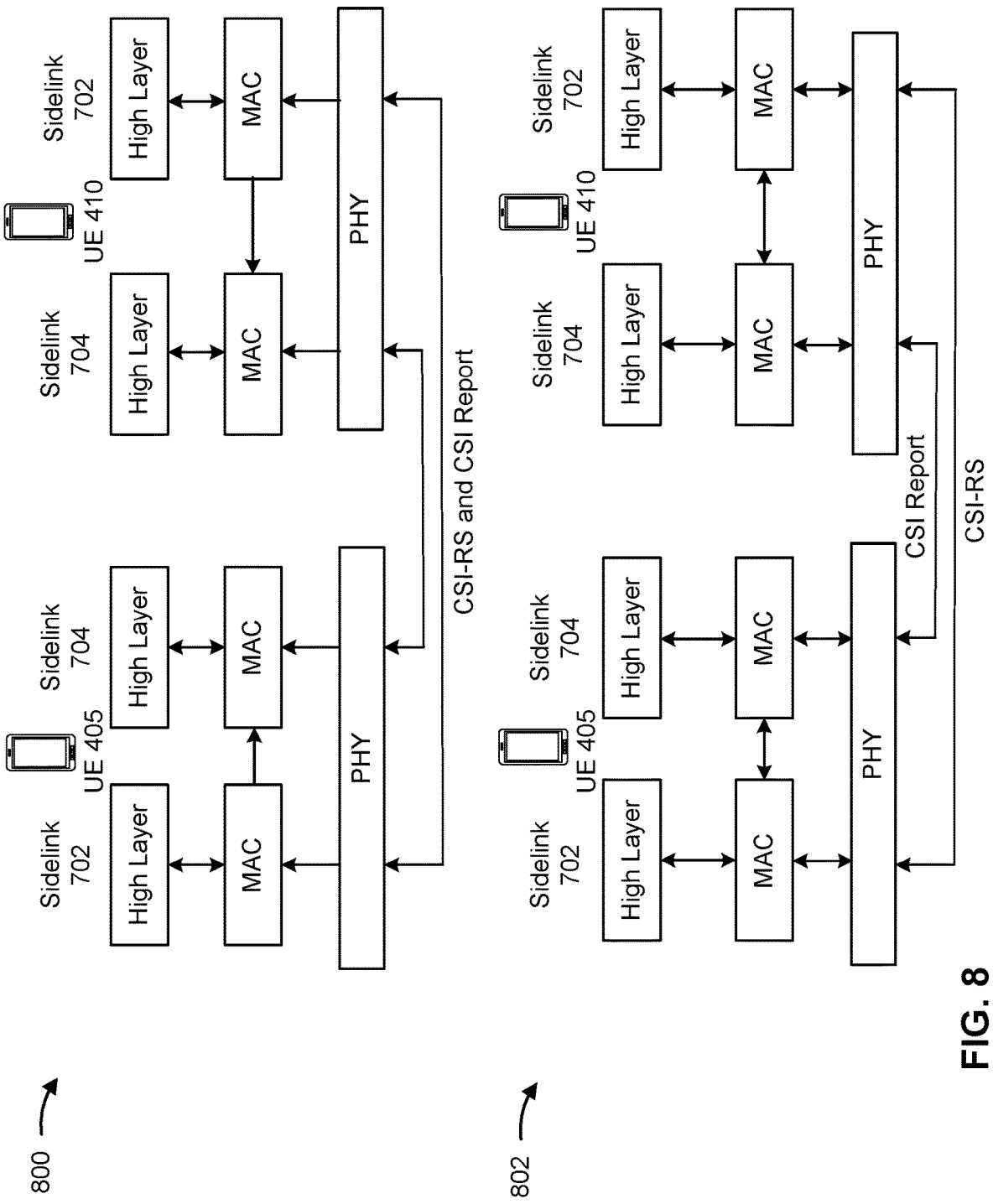
FIG. 8 is a diagram illustrating examples of sharing information about a sidelink, in accordance with the present disclosure.

FIG. 8 is a diagram illustrating examples 800 and 802 of sharing information about a sidelink, in accordance with the present disclosure. Examples 800 and 802 show sidelink 702 and sidelink 704 at a physical (PHY) layer, at a medium access control (MAC) layer, and at a higher layer.

UE 405 may share information for sidelink 702 with sidelink 704 at, for example, the MAC layer. In example 800, UE 405 may transmit a CSI-RS on sidelink 702 and may receive a CSI report on sidelink 702. In example 802, UE 405 may transmit an CSI-RS on sidelink 702 and receive a CSI report on sidelink 704. UE 405 may use the CSI report for future communications on sidelink 704. This may be applicable when a deactivated UE relay can only transmit or measure a reference signal but cannot receive SCI or data for power conservation purposes.

In some aspects, UE 405 may transmit the CSI report on dedicated sidelink 712. While the CSI report may be from measurements on sidelink 702 or sidelink 704, multiple sidelinks may use the CSI report provided on sidelink 712.

As indicated above, FIG. 8 provides some examples. Other examples may differ from what is described with regard to FIG. 8.

Figure 9:
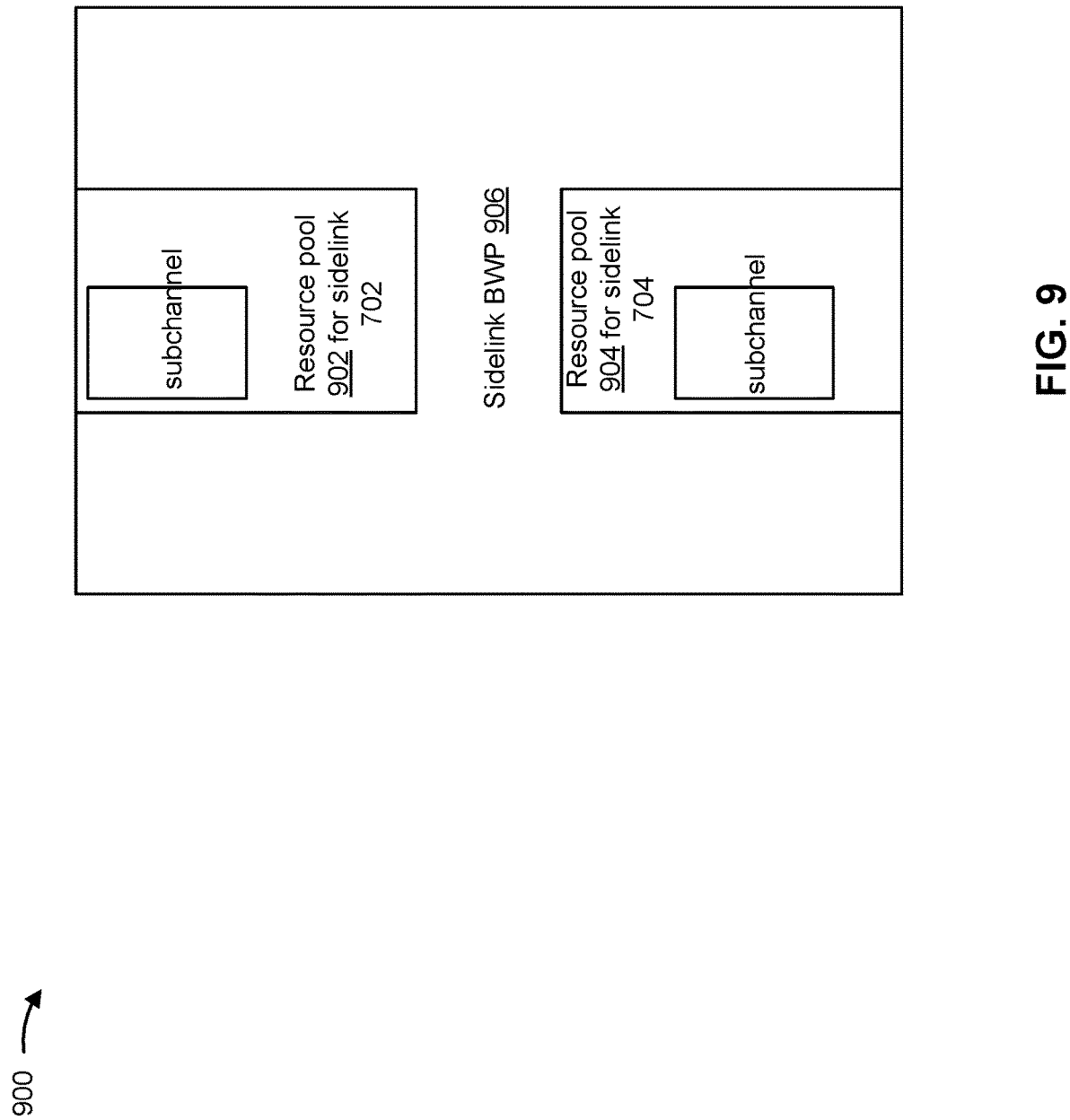
FIG. 9 is a diagram illustrating an example of sharing a channel quality indicator (CQI), in accordance with the present disclosure.

FIG. 9 is a diagram illustrating an example 900 of sharing a CQI, in accordance with the present disclosure. Example 900 shows resource pool 902 for sidelink 702 and resource pool 904 for sidelink 704 in a sidelink bandwidth part (BWP) 906.

In some aspects, a CQI measured from CSI-RS in one resource pool may only be used for the same resource pool or an overlapping resource pool. UE 405 may share the CQI, as a measurement report, across sidelinks. For example, if resource pool 902 of sidelink 702 and resource pool 904 of sidelink 704 are the same or overlap, UE 405 may transmit a CQI for sidelink 702 that is to be used for sidelink 704. This involves sidelink 702 and sidelink 704 using the same resource pool or an overlapping resource pool.

In some aspects, UE 405 may share the CQI using dedicated sidelink 712. This may involve using a dedicated sidelink resource pool or a wideband dedicated sidelink for CQI measurement across different resource pools.

As indicated above, FIG. 9 is provided as an example. Other examples may differ from what is described with regard to FIG. 9.

Figure 10:
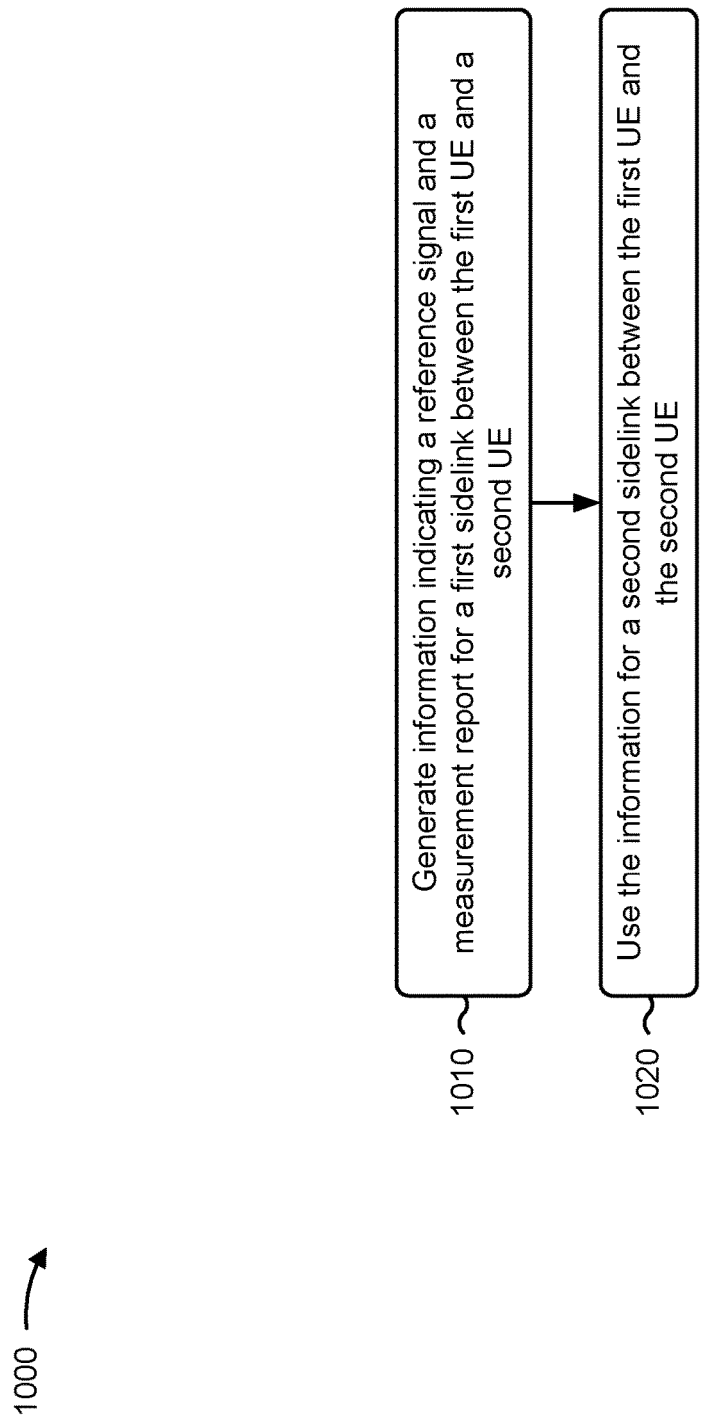
FIG. 10 is a diagram illustrating an example process performed, for example, by a first UE, in accordance with the present disclosure.

FIG. 10 is a diagram illustrating an example process 1000 performed, for example, by a first UE, in accordance with the present disclosure. Example process 1000 is an example where the first UE (e.g., UE 405) performs operations associated with sharing sidelink reference signals and measurement reports.

As shown in FIG. 10, in some aspects, process 1000 may include generating information indicating a reference signal and a measurement report for a first sidelink between the first UE and a second UE (block 1010). For example, the first UE (e.g., using communication manager 140 and/or generation component 1208 depicted in FIG. 12) may generate information indicating a reference signal and a measurement report for a first sidelink between the first UE and a second UE, as described above.

As further shown in FIG. 10, in some aspects, process 1000 may include using the information for a second sidelink between the first UE and the second UE (block 1020). For example, the first UE (e.g., using communication manager 140, transmission component 1204, and/or reception component 1202 depicted in FIG. 12) may use the information for a second sidelink between the first UE and the second UE, as described above.

Process 1000 may include additional aspects, such as any single aspect or any combination of aspects described below and/or in connection with one or more other processes described elsewhere herein.

In a first aspect, process 1000 includes transmitting the information to the second UE via the first sidelink or a sidelink that is dedicated for sharing the information between the first UE and the second UE.

In a second aspect, alone or in combination with the first aspect, the reference signal is dedicated for sidelink CSI reporting that is to be shared among multiple sidelinks between the first UE and the second UE. In a third aspect, alone or in combination with one or more of the first and second aspects, process 1000 includes transmitting or receiving the reference signal in FR2.

In a fourth aspect, alone or in combination with one or more of the first through third aspects, the first sidelink and the second sidelink are unicast sidelinks. In a fifth aspect, alone or in combination with one or more of the first through fourth aspects, the first sidelink and the second sidelink are broadcast sidelinks or groupcast sidelinks.

In a sixth aspect, alone or in combination with one or more of the first through fifth aspects, the reference signal includes a CSI-RS, a sidelink PSS, a sidelink SSS, or a sidelink DMRS.

In a seventh aspect, alone or in combination with one or more of the first through sixth aspects, the information indicating the reference signal includes a TCI state for the reference signal or a configuration for the reference signal.

In an eighth aspect, alone or in combination with one or more of the first through seventh aspects, process 1000 includes transmitting or receiving a MAC CE that activates the TCI state for the first sidelink and that includes a source ID and a destination ID of the second sidelink.

In a ninth aspect, alone or in combination with one or more of the first through eighth aspects, transmitting the information that includes the TCI state includes transmitting the information in a TCI state list on a sidelink between the first UE and the second UE that is dedicated for sharing the TCI state list.

In a tenth aspect, alone or in combination with one or more of the first through ninth aspects, process 1000 includes transmitting the reference signal via the first sidelink, and receiving the measurement report via the first sidelink or the second sidelink.

In an eleventh aspect, alone or in combination with one or more of the first through tenth aspects, receiving the measurement report includes receiving the measurement report at a MAC layer.

In a twelfth aspect, alone or in combination with one or more of the first through eleventh aspects, receiving the measurement report includes receiving the measurement report via a sidelink that is dedicated for sharing measurement reports.

In a thirteenth aspect, alone or in combination with one or more of the first through twelfth aspects, further comprising, if a resource pool of the first sidelink and a resource pool of the second sidelink are the same or overlap, transmitting a CQI for the first sidelink that is to be used for the second sidelink.

In a fourteenth aspect, alone or in combination with one or more of the first through fifteenth aspects, process 1000 includes transmitting a CQI for the first sidelink via a sidelink between the first UE and the second UE that is dedicated for sharing CQIs among multiple sidelinks between the first UE and the second UE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
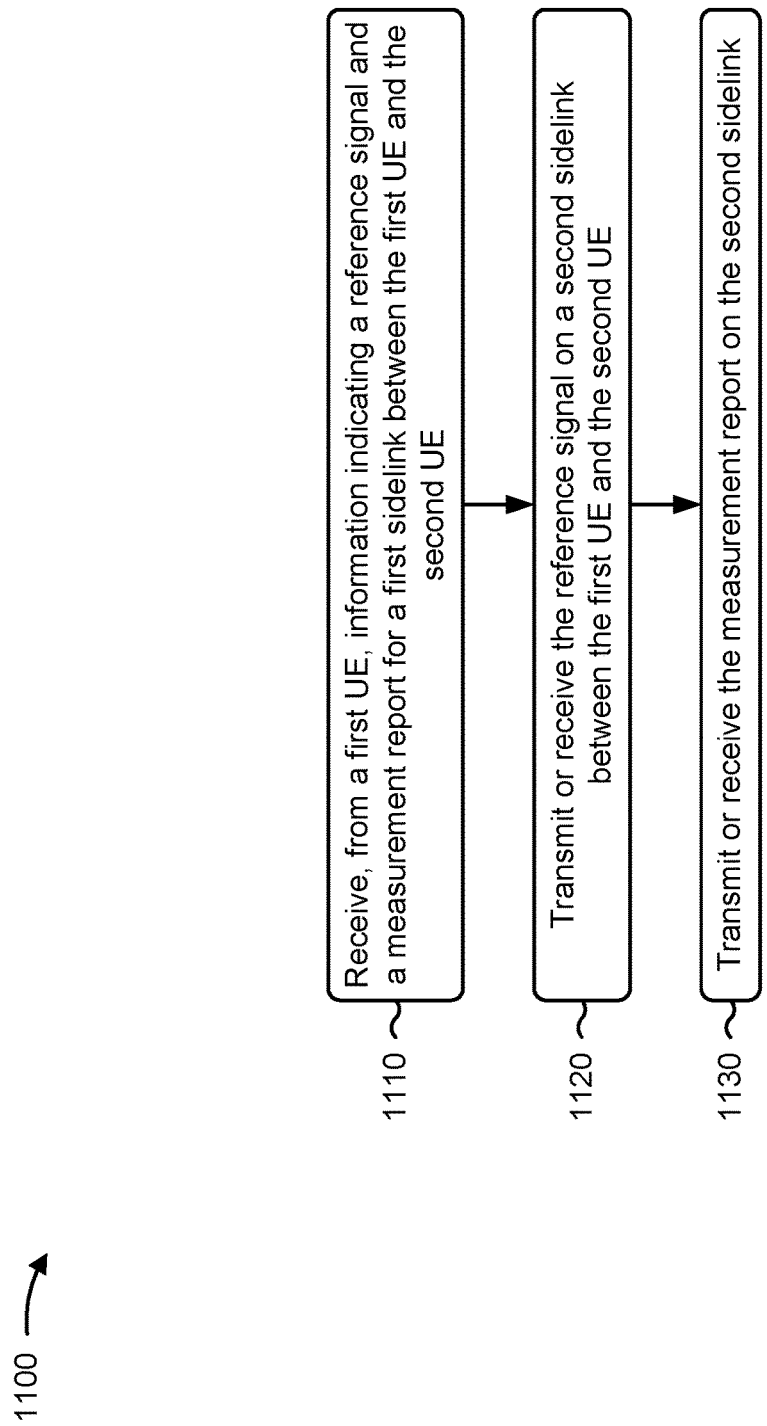
FIG. 11 is a diagram illustrating an example process performed, for example, by a second UE, in accordance with the present disclosure.

FIG. 11 is a diagram illustrating an example process 1100 performed, for example, by a second UE, in accordance with the present disclosure. Example process 1100 is an example where the second UE (e.g., UE 410) performs operations associated with sharing sidelink reference signals and measurement reports.

As shown in FIG. 11, in some aspects, process 1100 may include receiving, from a first UE, information indicating a reference signal and a measurement report for a first sidelink between the first UE and the second UE (block 1110). For example, the second UE (e.g., using communication manager 140 and/or reception component 1202, depicted in FIG. 12) may receive, from a first UE, information indicating a reference signal and a measurement report for a first sidelink between the first UE and the second UE, as described above.

As further shown in FIG. 11, in some aspects, process 1100 may include transmitting or receiving the reference signal on a second sidelink between the first UE and the second UE (block 1120). For example, the second UE (e.g., using communication manager 140 and/or transmission component 1204 depicted in FIG. 12) may transmit or receive the reference signal on a second sidelink between the first UE and the second UE, as described above.

As further shown in FIG. 11, in some aspects, process 1100 may include transmitting or receiving the measurement report on the second sidelink (block 1130). For example, the UE (e.g., using communication manager 140 and/or transmission component 1204 depicted in FIG. 12) may transmit or receive the measurement report on the second sidelink, as described above.

Process 1100 may include additional aspects, such as any single aspect or any combination of aspects described below and/or in connection with one or more other processes described elsewhere herein.

In a first aspect, process 1100 includes transmitting or receiving a communication on the second sidelink based at least in part on the measurement report or a measurement of the reference signal.

In a second aspect, alone or in combination with the first aspect, the information is dedicated for sidelink CSI reporting that is to be shared among multiple sidelinks between the first UE and the second UE.

In a third aspect, alone or in combination with one or more of the first and second aspects, the information indicating the reference signal includes a TCI state for the reference signal or a configuration for the reference signal.

In a fourth aspect, alone or in combination with one or more of the first through third aspects, process 1100 includes transmitting or receiving a MAC CE that activates the TCI state for the first sidelink and that includes a source ID and a destination ID of the second sidelink.

In a fifth aspect, alone or in combination with one or more of the first through fourth aspects, receiving the information that includes the TCI state includes receiving the information in a TCI state list on a sidelink between the first UE and the second UE that is dedicated for sharing the TCI state list.

In a sixth aspect, alone or in combination with one or more of the first through fifth aspects, process 1100 includes receiving a CQI for the first sidelink that is to be used for the second sidelink, if a resource pool of the first sidelink and a resource pool of the second sidelink are the same or overlap.

In a seventh aspect, alone or in combination with one or more of the first through sixth aspects, process 1100 includes receiving a CQI for the first sidelink via a sidelink between the first UE and the second UE that is dedicated for sharing CQIs among multiple sidelinks between the first UE and the second UE.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
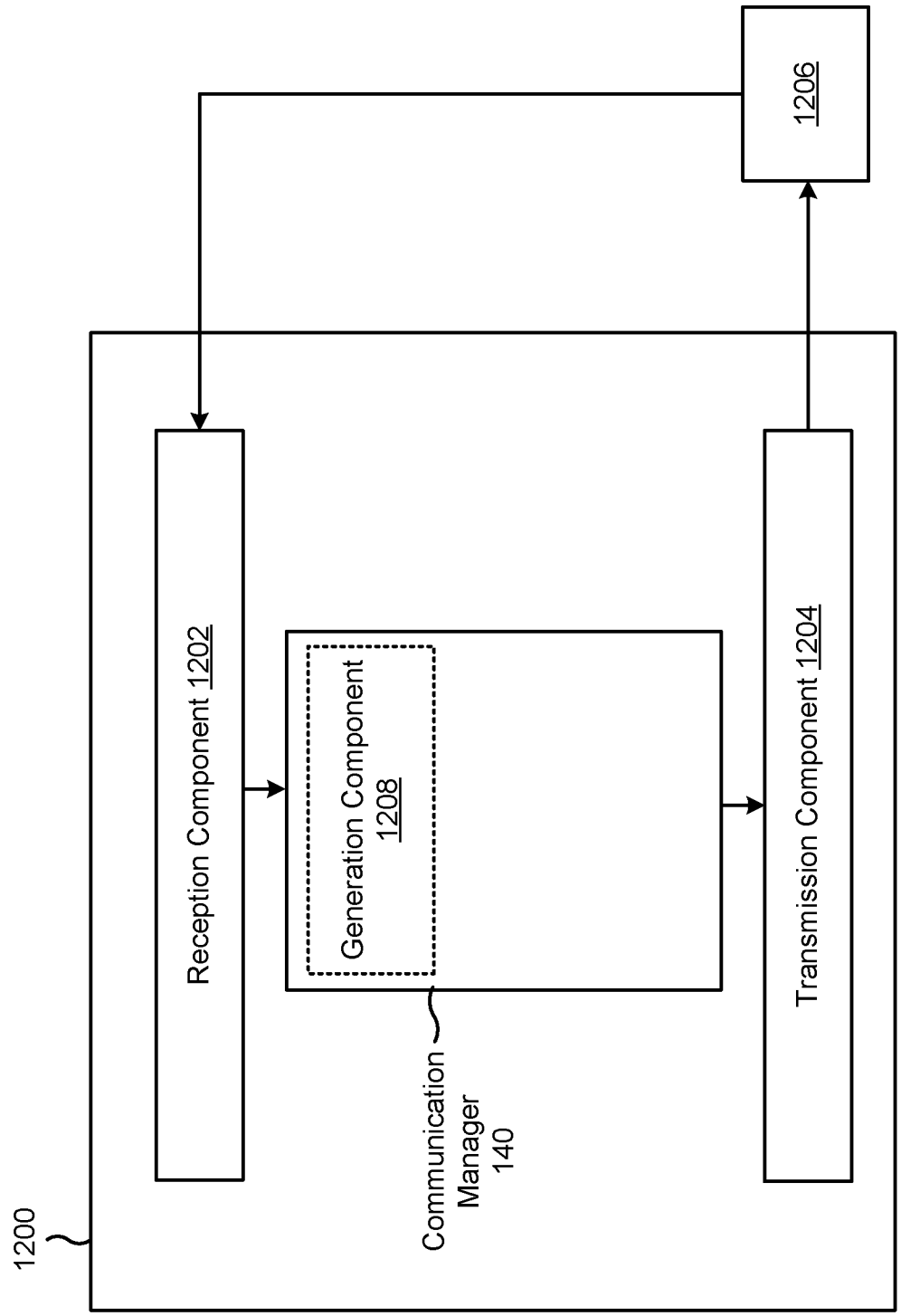
FIG. 12 is a diagram of an example apparatus for wireless communication, in accordance with the present disclosure.

FIG. 12 is a diagram of an example apparatus 1200 for wireless communication. The apparatus 1200 may be a first UE (e.g., UE 405) or a second UE (e.g., UE 410), or a first UE or second UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include a generation component 1208, among other examples.

In some aspects, the apparatus 1200 may be configured to perform one or more operations described herein in connection with FIGS. 1-9. Additionally, or alternatively, the apparatus 1200 may be configured to perform one or more processes described herein, such as process 1000 of FIG. 10, process 1100 of FIG. 11, or a combination thereof. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

In some aspects, the apparatus 1200 may be a first UE. The generation component 1208 may generate information indicating a reference signal and a measurement report for a first sidelink between the first UE and a second UE. The transmission component 1204 or the reception component 1202 may use the information for a second sidelink between the first UE and the second UE.

The transmission component 1204 may transmit the information to the second UE via the first sidelink or a sidelink that is dedicated for sharing the information between the first UE and the second UE.

The transmission component 1204 may transmit or receive the reference signal in FR2. The transmission component 1204 may transmit or receive a MAC CE that activates the TCI state for the first sidelink and that includes a source ID and a destination ID of the second sidelink. The transmission component 1204 may transmit the reference signal via the first sidelink. The reception component 1202 may receive the measurement report via the first sidelink or the second sidelink.

The transmission component 1204 may transmit a CQI for the first sidelink via a sidelink between the first UE and the second UE that is dedicated for sharing CQIs among multiple sidelinks between the first UE and the second UE.

In some aspects, the apparatus 1200 may be a second UE. The reception component 1202 may receive, from a first UE, information indicating a reference signal and a measurement report for a first sidelink between the first UE and the second UE. The transmission component 1204 may transmit or receive the reference signal on a second sidelink between the first UE and the second UE. The transmission component 1204 may transmit or receive the measurement report on the second sidelink.

The transmission component 1204 may transmit or receive a communication on the second sidelink based at least in part on the measurement report or a measurement of the reference signal. The transmission component 1204 may transmit or receive a MAC CE that activates the TCI state for the first sidelink and that includes a source ID and a destination ID of the second sidelink.

The reception component 1202 may receive a CQI for the first sidelink that is to be used for the second sidelink, if a resource pool of the first sidelink and a resource pool of the second sidelink are the same or overlap. The reception component 1202 may receive a CQI for the first sidelink via a sidelink, between the first UE and the second UE, that is dedicated for sharing CQIs among multiple sidelinks between the first UE and the second UE.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a first user equipment (UE), comprising: generating information indicating a reference signal and a measurement report for a first sidelink between the first UE and a second UE; and using the information for a second sidelink between the first UE and the second UE.

Aspect 2: The method of Aspect 1, further comprising transmitting the information to the second UE via the first sidelink or a sidelink that is dedicated for sharing the information between the first UE and the second UE.

Aspect 3: The method of Aspect 1 or 2, wherein the reference signal is dedicated for sidelink channel state information (CSI) reporting that is to be shared among multiple sidelinks between the first UE and the second UE.

Aspect 4: The method of any of Aspects 1-3, further comprising transmitting or receiving the reference signal in frequency range 2 (FR2).

Aspect 5: The method of any of Aspects 1-4, wherein the first sidelink and the second sidelink are unicast sidelinks.

Aspect 6: The method of any of Aspects 1-4, wherein the first sidelink and the second sidelink are broadcast sidelinks or groupcast sidelinks.

Aspect 7: The method of any of Aspects 1-6, wherein the reference signal includes a channel state information reference signal (CSI-RS), a sidelink primary synchronization signal, a sidelink secondary synchronization signal, or a sidelink demodulation reference signal.

Aspect 8: The method of any of Aspects 1-7, wherein the information indicating the reference signal includes a transmission configuration indicator (TCI) state for the reference signal or a configuration for the reference signal.

Aspect 9: The method of Aspect 8, further comprising transmitting or receiving a medium access control control element (MAC CE) that activates the TCI state for the first sidelink and that includes a source identifier (ID) and a destination ID of the second sidelink.

Aspect 10: The method of Aspect 8 or 9, wherein transmitting the information that includes the TCI state includes transmitting the information in a TCI state list on a sidelink between the first UE and the second UE that is dedicated for sharing the TCI state list.

Aspect 11: The method of any of Aspects 1-10, further comprising: transmitting the reference signal via the first sidelink; and receiving the measurement report via the first sidelink or the second sidelink.

Aspect 12: The method of Aspect 11, wherein receiving the measurement report includes receiving the measurement report at a medium access control layer.

Aspect 13: The method of Aspect 11 or 12, wherein receiving the measurement report includes receiving the measurement report via a sidelink that is dedicated for sharing measurement reports.

Aspect 14: The method of any of Aspects 1-13, further comprising, if a resource pool of the first sidelink and a resource pool of the second sidelink are the same or overlap, transmitting a channel quality indicator (CQI) for the first sidelink that is to be used for the second sidelink.

Aspect 15: The method of any of Aspects 1-14, further comprising transmitting a channel quality indicator (CQI) for the first sidelink via a sidelink between the first UE and the second UE that is dedicated for sharing CQIs among multiple sidelinks between the first UE and the second UE.

Aspect 16: A method of wireless communication performed by a second user equipment (UE), comprising: receiving, from a first UE, information indicating a reference signal and a measurement report for a first sidelink between the first UE and the second UE; transmitting or receiving the reference signal on a second sidelink between the first UE and the second UE; and transmitting or receiving the measurement report on the second sidelink.

Aspect 17: The method of Aspect 16, further comprising transmitting or receiving a communication on the second sidelink based at least in part on the measurement report or a measurement of the reference signal.

Aspect 18: The method of Aspect 16 or 17, wherein the information is dedicated for sidelink channel state information (CSI) reporting that is to be shared among multiple sidelinks between the first UE and the second UE.

Aspect 19: The method of any of Aspects 16-18, wherein the information indicating the reference signal includes a transmission configuration indicator (TCI) state for the reference signal or a configuration for the reference signal.

Aspect 20: The method of Aspect 19, further comprising transmitting or receiving a medium access control control element (MAC CE) that activates the TCI state for the first sidelink and that includes a source identifier (ID) and a destination ID of the second sidelink.

Aspect 21: The method of Aspect 20, wherein receiving the information that includes the TCI state includes receiving the information in a TCI state list on a sidelink between the first UE and the second UE that is dedicated for sharing the TCI state list.

Aspect 22: The method of any of Aspects 16-21, further comprising receiving a channel quality indicator (CQI) for the first sidelink that is to be used for the second sidelink, if a resource pool of the first sidelink and a resource pool of the second sidelink are the same or overlap.

Aspect 23: The method of any of Aspects 16-22, further comprising receiving a channel quality indicator (CQI) for the first sidelink via a sidelink, between the first UE and the second UE, that is dedicated for sharing CQIs among multiple sidelinks between the first UE and the second UE.

Aspect 24: An apparatus for wireless communication at a device, comprising a processor; memory coupled with the processor; and instructions stored in the memory and executable by the processor to cause the apparatus to perform the method of one or more of Aspects 1-23.

Aspect 25: A device for wireless communication, comprising a memory and one or more processors coupled to the memory, the one or more processors configured to perform the method of one or more of Aspects 1-23.

Aspect 26: An apparatus for wireless communication, comprising at least one means for performing the method of one or more of Aspects 1-23.

Aspect 27: A non-transitory computer-readable medium storing code for wireless communication, the code comprising instructions executable by a processor to perform the method of one or more of Aspects 1-23.

Aspect 28: A non-transitory computer-readable medium storing a set of instructions for wireless communication, the set of instructions comprising one or more instructions that, when executed by one or more processors of a device, cause the device to perform the method of one or more of Aspects 1-23.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of a list of" items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) for wireless communication, comprising:
   one or more memories; and
   one or more processors, coupled to the one or more memories, configured to:
   generate information indicating a reference signal and a measurement report for a first sidelink between the first UE and a second UE; and
   use the information for a second sidelink between the first UE and the second UE;
   wherein the reference signal is dedicated for sidelink channel state information (CSI) reporting that is to be shared among multiple sidelinks between the first UE and the second UE.

2. The first UE of claim 1, wherein the one or more processors are configured to transmit the information to the second UE via the first sidelink or a sidelink that is dedicated for sharing the information between the first UE and the second UE.

3. The first UE of claim 1, wherein the one or more processors are configured to transmit or receive the reference signal in frequency range 2 (FR2).

4. The first UE of claim 1, wherein the first sidelink and the second sidelink are unicast sidelinks.

5. The first UE of claim 1, wherein the first sidelink and the second sidelink are broadcast sidelinks or groupcast sidelinks.

6. The first UE of claim 1, wherein the reference signal includes a channel state information reference signal (CSI-RS), a sidelink primary synchronization signal, a sidelink secondary synchronization signal, or a sidelink demodulation reference signal.

7. The first UE of claim 1, wherein the one or more processors are configured to:
   transmit the reference signal via the first sidelink; and
   receive the measurement report via the first sidelink or the second sidelink.

8. The first UE of claim 7, wherein the one or more processors, to receive the measurement report, are configured to receive the measurement report at a medium access control layer.

9. The first UE of claim 1, wherein the one or more processors are configured to receive the measurement report via a dedicated sidelink for sharing measurement reports.

10. The first UE of claim 1, wherein the one or more processors are configured to, if a resource pool of the first sidelink and a resource pool of the second sidelink are the same or overlap, transmit a channel quality indicator (CQI) for the first sidelink that is to be used for the second sidelink.

11. The first UE of claim 1, wherein the one or more processors are configured to transmit a channel quality indicator (CQI) for the first sidelink via the first sidelink, the second sidelink, or a dedicated sidelink between the first UE and the second UE that is dedicated for sharing CQIs among multiple sidelinks between the first UE and the second UE.

12. A second user equipment (UE) for wireless communication, comprising:
    one or more memories; and
    one or more processors, coupled to the one or more memories, configured to:

receive, from a first UE, information indicating a reference signal and a measurement report for a first sidelink between the first UE and the second UE;

transmit or receive the reference signal on a second sidelink between the first UE and the second UE; and transmit or receive the measurement report on the second sidelink;

wherein the information is dedicated for sidelink channel state information (CSI) reporting that is to be shared among multiple sidelinks between the first UE and the second UE.

13. The second UE of claim 12, wherein the one or more processors are configured to transmit or receive a communication on the second sidelink based at least in part on the measurement report or a measurement of the reference signal.

14. The second UE of claim 12, wherein the information is dedicated for sidelink channel state information (CSI) reporting that is to be shared among multiple sidelinks between the first UE and the second UE.

15. The second UE of claim 12, wherein the one or more processors are configured to receive a channel quality indicator (CQI) for the first sidelink that is to be used for the second sidelink, if a resource pool of the first sidelink and a resource pool of the second sidelink are the same or overlap.

16. The second UE of claim 12, wherein the one or more processors are configured to receive a channel quality indicator (CQI) for the first sidelink via the first sidelink, the second sidelink, or a dedicated sidelink, between the first UE and the second UE, that is dedicated for sharing CQIs among multiple sidelinks between the first UE and the second UE.

17. A method of wireless communication performed by a first user equipment (UE), comprising:

generating information indicating a reference signal and a measurement report for a first sidelink between the first UE and a second UE; and using the information for a second sidelink between the first UE and the second UE;

wherein the reference signal is dedicated for sidelink channel state information (CSI) reporting that is to be shared among multiple sidelinks between the first UE and the second UE.

18. The method of claim 17, further comprising transmitting the information to the second UE via the first sidelink or a sidelink that is dedicated for sharing the information between the first UE and the second UE.

19. The method of claim 17, wherein the information indicating the reference signal includes a transmission configuration indicator (TCI) state for the reference signal or a configuration for the reference signal.

20. The method of claim 17, further comprising transmitting a channel quality indicator (CQI) for the first sidelink via the first sidelink, the second sidelink, or a dedicated sidelink between the first UE and the second UE that is dedicated for sharing CQIs among multiple sidelinks between the first UE and the second UE.

21. A method of wireless communication performed by a second user equipment (UE), comprising:

receiving, from a first UE, information indicating a reference signal and a measurement report for a first sidelink between the first UE and the second UE;

transmitting or receiving the reference signal on a second sidelink between the first UE and the second UE; and transmitting or receiving the measurement report on the second sidelink;

wherein the reference signal is dedicated for sidelink channel state information (CSI) reporting that is to be shared among multiple sidelinks between the first UE and the second UE.

22. The method of claim 21, further comprising transmitting or receiving a communication on the second sidelink based at least in part on the measurement report or a measurement of the reference signal.

23. A first user equipment (UE) for wireless communication, comprising:

one or more memories; and one or more processors, coupled to the one or more memories, configured to:

generate information indicating a reference signal and a measurement report for a first sidelink between the first UE and a second UE; and use the information for a second sidelink between the first UE and the second UE;

wherein:

the information indicating the reference signal includes a transmission configuration indicator (TCI) state for the reference signal or a configuration for the reference signal; and the one or more processors are configured to transmit or receive a medium access control control element (MAC CE) that activates the TCI state for the first sidelink and that includes a source identifier (ID) and a destination ID of the second sidelink; or the one or more processors, to transmit the information that includes the TCI state, are configured to transmit the information that includes the TCI state in a TCI state list on a sidelink between the first UE and the second UE that is dedicated for sharing the TCI state list.

24. A second user equipment (UE) for wireless communication, comprising:

one or more memories; and one or more processors, coupled to the one or more memories, configured to:

receive, from a first UE, information indicating a reference signal and a measurement report for a first sidelink between the first UE and the second UE;

transmit or receive the reference signal on a second sidelink between the first UE and the second UE; and transmit or receive the measurement report on the second sidelink;

wherein:

the information indicating the reference signal includes a transmission configuration indicator (TCI) state for the reference signal or a configuration for the reference signal; and the one or more processors are configured to transmit or receive a medium access control control element (MAC CE) that activates the TCI state for the first sidelink and that includes a source identifier (ID) and a destination ID of the second sidelink; or the one or more processors, to receive the information that includes the TCI state, are configured to receive the information that includes the TCI state in a TCI state list on a sidelink between the first UE and the second UE that is dedicated for sharing the TCI state list.

* * * * *